United States Patent
Searcy et al.

(10) Patent No.: US 11,201,673 B1
(45) Date of Patent: Dec. 14, 2021

(54) OPTICAL LASER COMMUNICATION APPARATUS WITH OPTICAL PHASED ARRAYS AND COUPLING ARRANGEMENT AND ASSOCIATED METHODS

(71) Applicant: BridgeComm, Inc., Denver, CO (US)

(72) Inventors: Paul Searcy, Niwot, CO (US); Barry A. Matsumori, Rolling Hills Estates, CA (US)

(73) Assignee: BridgeSat, Inc., Denver, CO (US)

( * ) Notice: Subject to any disclaimer, the term of this patent is extended or adjusted under 35 U.S.C. 154(b) by 0 days.

(21) Appl. No.: 16/294,040

(22) Filed: Mar. 6, 2019

Related U.S. Application Data

(60) Provisional application No. 62/661,472, filed on Apr. 23, 2018, provisional application No. 62/639,991, filed on Mar. 7, 2018.

(51) Int. Cl.
| | |
|---|---|
| *H04B 10/00* | (2013.01) |
| *H04B 10/118* | (2013.01) |
| *H04B 10/116* | (2013.01) |
| *H04B 10/40* | (2013.01) |
| *H04B 10/80* | (2013.01) |
| *H04B 10/50* | (2013.01) |

(52) U.S. Cl.
CPC ......... *H04B 10/118* (2013.01); *H04B 10/116* (2013.01); *H04B 10/40* (2013.01); *H04B 10/503* (2013.01); *H04B 10/803* (2013.01)

(58) Field of Classification Search
CPC ............................ H04B 10/116; H04B 10/118
See application file for complete search history.

(56) References Cited

U.S. PATENT DOCUMENTS

| | | | | |
|---|---|---|---|---|
| 4,864,310 A | * | 9/1989 | Bernard | H01Q 3/2676 342/368 |
| 6,377,730 B1 | * | 4/2002 | Bergmann | G02B 6/12019 385/24 |
| 6,609,690 B1 | * | 8/2003 | Davis | H04B 10/112 248/200.1 |
| 6,724,508 B2 | * | 4/2004 | Pierce | G02B 5/32 359/15 |
| 6,760,512 B2 | * | 7/2004 | Pepper | G02F 1/011 385/15 |
| 6,847,496 B1 | * | 1/2005 | Presby | H04B 10/1123 359/599 |
| 7,920,794 B1 | * | 4/2011 | Whaley | H04B 10/1125 398/122 |

(Continued)

OTHER PUBLICATIONS

Hirofumi Yamazaki, "Estimation of the possible scale for holographic switches with liquid-crystal displays", Applied Optics, vol. 34, Issue 8, pp. 1333-1340 (Year: 1995).*

*Primary Examiner* — David G Payne
*Assistant Examiner* — Pranesh K Barua
(74) *Attorney, Agent, or Firm* — Patents Integrated

(57) ABSTRACT

An optical communications transmitter for use in free space communication from the transmitter to a receiver, the transmitter including a light input and an optical fiber array for directing the light input. The optical communications transmitter further includes an optical phased array for receiving the light input from the optical fiber array and transmitting a light output, the optical phased array being configured for modifying a relative phase of the light input such that the light output exhibits a predetermined far-field intensity pattern.

8 Claims, 7 Drawing Sheets

(56) References Cited

U.S. PATENT DOCUMENTS

| | | | | |
|---|---|---|---|---|
| 8,351,793 B2* | 1/2013 | Chui | ................... | G02B 6/00 362/602 |
| 8,681,422 B2* | 3/2014 | Haller | ................... | G02B 6/356 359/572 |
| 9,826,293 B2* | 11/2017 | Gauthier | ............ | H04Q 11/0066 |
| 2002/0109886 A1* | 8/2002 | Barbier | ............ | G02B 6/4246 398/121 |
| 2003/0113055 A1* | 6/2003 | Zhao | ................... | G02B 6/29302 385/16 |
| 2003/0151818 A1* | 8/2003 | Wagner | ............... | G02B 6/4204 359/578 |
| 2004/0101317 A1* | 5/2004 | Yap | ................... | H04B 10/50 398/187 |
| 2008/0031627 A1* | 2/2008 | Smith | ................... | G02B 6/2931 398/83 |
| 2009/0142073 A1* | 6/2009 | Smith | ................... | H04B 10/50 398/192 |
| 2009/0180781 A1* | 7/2009 | Harper | ............... | H04B 10/1121 398/130 |
| 2012/0050849 A1* | 3/2012 | Schreiber | ............ | G02B 21/0032 359/371 |
| 2013/0070328 A1* | 3/2013 | Wagener | ............... | G02B 6/356 359/291 |
| 2013/0089331 A1* | 4/2013 | Kim | ................... | H04J 14/0232 398/72 |
| 2013/0315604 A1* | 11/2013 | LoPresti | ............ | H04B 10/1123 398/116 |
| 2013/0336661 A1* | 12/2013 | Chorvalli | ............ | H04B 10/118 398/119 |
| 2014/0023381 A1* | 1/2014 | Hunt | ................... | H04B 10/112 398/207 |
| 2014/0132999 A1* | 5/2014 | Pyun | ................... | G03H 1/0476 359/10 |
| 2014/0205291 A1* | 7/2014 | Suzuki | ............... | G02B 6/3518 398/48 |
| 2015/0171968 A1* | 6/2015 | Featherston | ....... | H04B 10/1123 398/118 |
| 2015/0244457 A1* | 8/2015 | O'Brien | ............ | G06F 1/1698 398/118 |
| 2019/0081706 A1* | 3/2019 | Neilson | ............... | H04B 10/29 |

* cited by examiner

OPTICAL LASER COMMUNICATION APPARATUS WITH OPTICAL PHASED ARRAYS AND COUPLING ARRANGEMENT AND ASSOCIATED METHODS

FIELD OF THE INVENTION

The present invention relates to laser communications and, more particularly, to laser communication transceivers for communicating between ground, satellite, and moving objects such as aircraft, unmanned autonomous vehicles (UAVs), trucks, cars and ship-based targets.

BACKGROUND OF THE INVENTION

Current communication systems rely on the use of radio frequencies (RF) for the data downlink from low Earth orbit (LEO) small satellite (SmallSat) or from Geostationary satellites (GEO). An illustration of a variety of currently available communication configurations is shown in FIG. 1. As shown in FIG. 1, communication channels between different geostationary earth orbit (GEO) satellites, between a GEO satellite and lower earth orbit (LEO) satellites, between a GEO satellite and a ground station, mobile user on an aircraft or submarine, or an unmanned autonomous vehicle (UAV) are currently possible. However, there are limitations to the data rates and data capacity of RF SmallSats due to the frequency range and mechanical limitations of the current systems.

For example, the transceivers and ground stations of current systems require gimbals and other large mechanical means for physically scanning the field of view of the devices through a range of angles in order to be able to capture signal over those angles. This requirement is due to the fact that the currently available transceivers include a single aperture telescope for capturing and transmitting data signals therebetween. Such mechanical implementations are impractical or even detrimental for physical space and weight constrained applications such as on airplanes and UAVs.

SUMMARY OF THE INVENTION

In accordance with the embodiments described herein, an optical communications transmitter for use in free space communication from the transmitter to a receiver is described. The transmitter includes a light input, and an optical fiber array for directing the light input. The transmitter further includes an optical phased array for receiving the light input from the optical fiber array and transmitting a light output. The optical phased array is configured for modifying a relative phase of the light input such that the light output exhibits a predetermined far-field intensity pattern.

In accordance with another embodiment, the optical phased array modifies the relative phase of the light input without using mechanical devices.

As an alternative, the optical phased array is selected from a liquid crystal-based phased array, a holographic phased array, a spatial light modulator, a thermo-optic modulator, and a beam steering device.

As a further alternative, the optical phased array modifies the relative phase of the light input without any moving components.

In another embodiment, the optical phased array in the transmitter modifies the relative phase of the light input to produce the far-field pattern for more efficiently depositing the light output on the receiver than without the optical phased array.

In still another embodiment, the optical communications transmitter of claim 1 further includes one or more additional optical components selected from a lens, a mirror, a fiber amplifier, a light splitter, a liquid crystal polymer grating, a fast-steering mirror, a retro-reflector with a back-facet modulator, a liquid crystal modulator, a micro-electromechanical (MEMS) modulator, an electro-wetting material, and an acousto-optic modulator.

In accordance with a further embodiment, an optical receiver for use in free space communication from a transmitter to the optical receiver includes an external window configured for passing visible light as well as optical signals of communication wavelengths therethrough. The optical receiver also includes an optical switch, a waveguide, a receiver, and an internal window. The optical switch is configured for redirecting optical signals from a plurality of incidence angles into an input ray having an angle within a range of acceptance angles for the waveguide. The waveguide is configured for selectively directing optical signals incident thereon toward the receiver, while passing visible light through to the internal window.

In another embodiment, the optical receiver further includes a coating on the internal window for blocking the optical signals from passing through the internal window.

In still another embodiment, the optical receiver includes a liquid crystal optical angle switch as the optical switch.

In an alternative embodiment, the optical switch is configured for compensating for differences in optical path lengths of the optical signals received from the plurality of incidence angles. In a further embodiment, the optical receiver includes a compensator for providing additional optical path length compensation. In an example embodiment, the compensator is adjustable.

In another embodiment, the waveguide is split into at least two sections.

In yet another embodiment, the waveguide includes a holographic layer.

Further details regarding the various embodiments are provided in the detailed description along with the associated figures.

DETAILED DESCRIPTION OF EMBODIMENTS OF THE INVENTION

Figure 1:
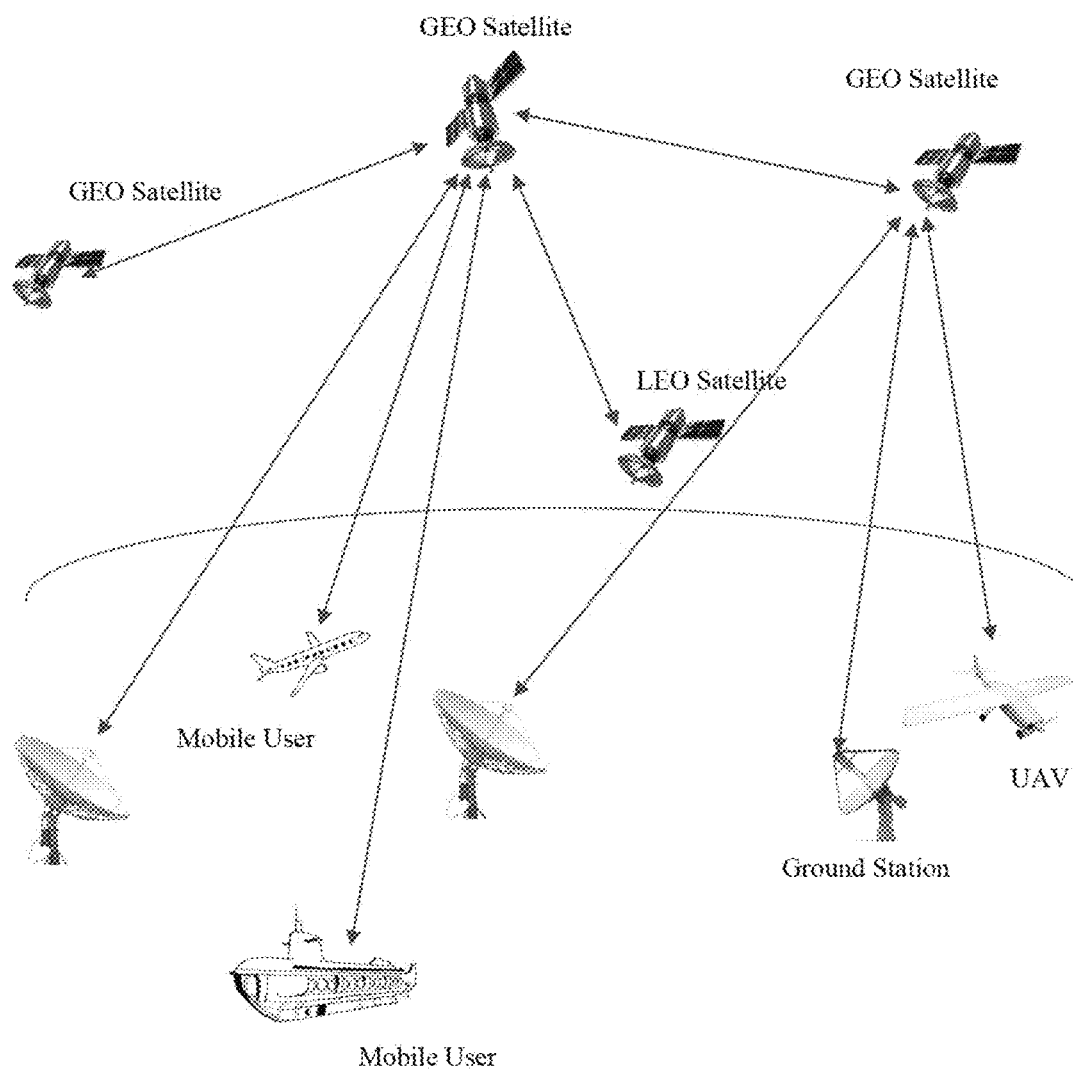
FIG. 1 illustrates a variety of communication configurations between different components that are currently available via RF communications.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Space-based optical communication systems are poised to take a breakthrough role in commercial SmallSat missions. New technology developments are enabling the migration from traditional RF designs to optical communications to provide a significant leap in the data downlink capabilities of LEO SmallSats.

A factor in the transition from RF systems to optical systems is the availability of a full turnkey solution that seamlessly connects SmallSats and high-altitude UAVs to servers on the ground, while accommodating the accelerating demand for accurate and frequent data collection from LEO SmallSats. Such an optical connectivity system will increase the speed, security, and efficiency of data transmissions from LEO SmallSats with additional capabilities beyond those provided by RF systems.

One of the key components in this transition is the combination of innovative transceiver and ground station designs that expands the capabilities of optical systems beyond those of RF systems. Using more compact transceiver arrangements operating at optical frequencies that can be conformally mounted without gimbals on aircraft or UAV, for example, would be of great advantage.

In accordance with an embodiment, an optical transmitter for use in laser communications combines input from an optical fiber array with an optical phased array such that the relative phase of the emission is non-mechanically controlled to produce a desired far-field intensity pattern. For instance, the phase modulation performed by the optical phased array produces a predetermined far-field pattern, which efficiently deposits the light output on a distant receiver. In an exemplary embodiment, the implementation is purely non-mechanical, and does not include any additional optical components, such as lenses and mirrors, nor mechanics such as gimbals. In an alternative embodiment, certain optical components, such as fiber amplifiers and light splitters, are included to modify the transmitted optical signal. Suitable optical phased arrays include, but are not limited to, liquid crystal-based phased arrays, holographic phased arrays, spatial light modulators, thermo-optic modulators, and other types of phase modulation and beam steering devices that are programmable.

Figure 2:
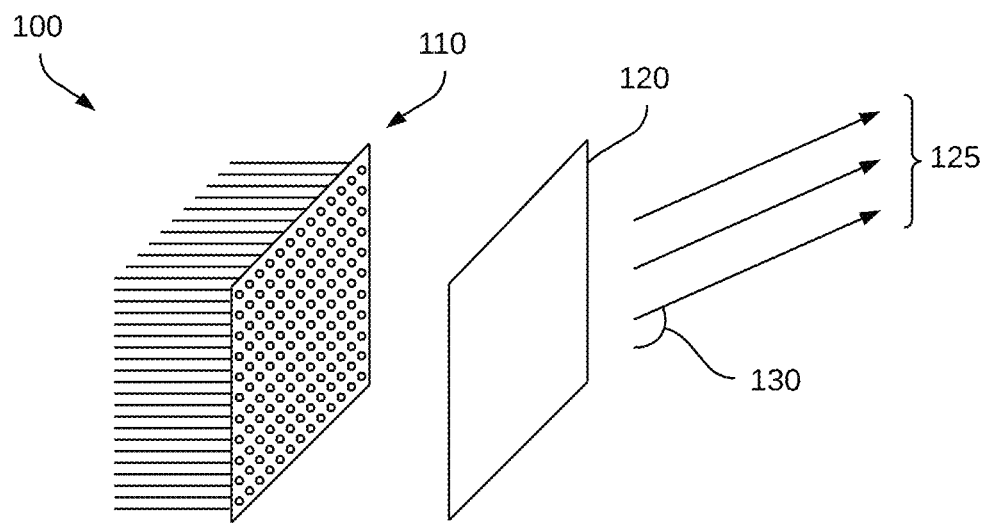
FIG. 2 shows an exemplary transmitter arrangement, in accordance with an embodiment.

An exemplary embodiment of a transmitter 100 including an optical phased array is shown in FIG. 2. Light input from a fiber array 110 are directed through an optical phased array 120 and transmitted as light rays 125 at an angle 130 with respect to a surface of optical phased array 120. Relative phase of each one of light rays 125 is modulated by optical phased array 120 so as to result in a far-field intensity pattern that has been specified by the overall optical communication system.

Figure 3:
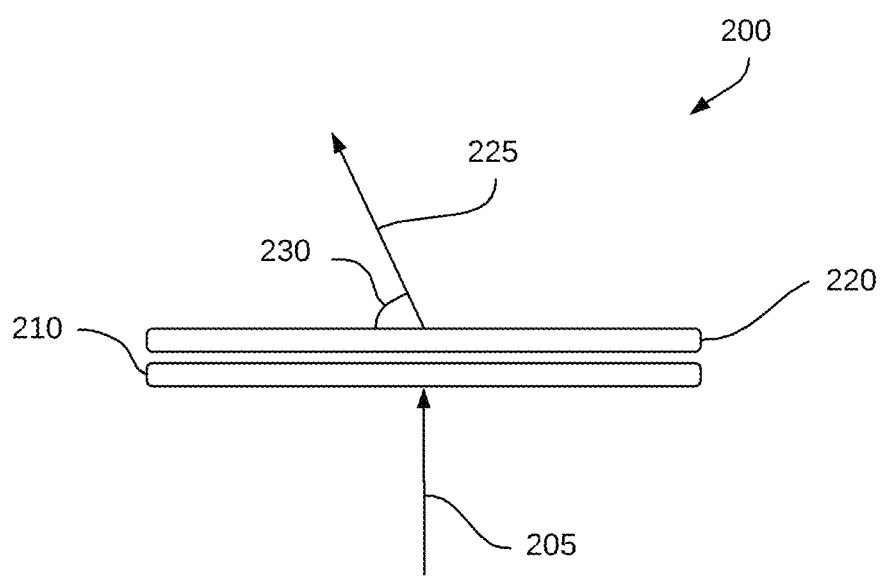
FIG. 3 shows a side view of an exemplary transmitter arrangement, in accordance with an embodiment.

A side view of an exemplary embodiment of a transmitter 200 is shown in FIG. 3. A light input 205 is directed into a coupler 210, which couples light input 205 through an optical phased array 220. As a result, a light ray 225 is transmitted from optical phased array 220 at an angle 230 with respect to a surface of optical phased array 220.

Figure 4:
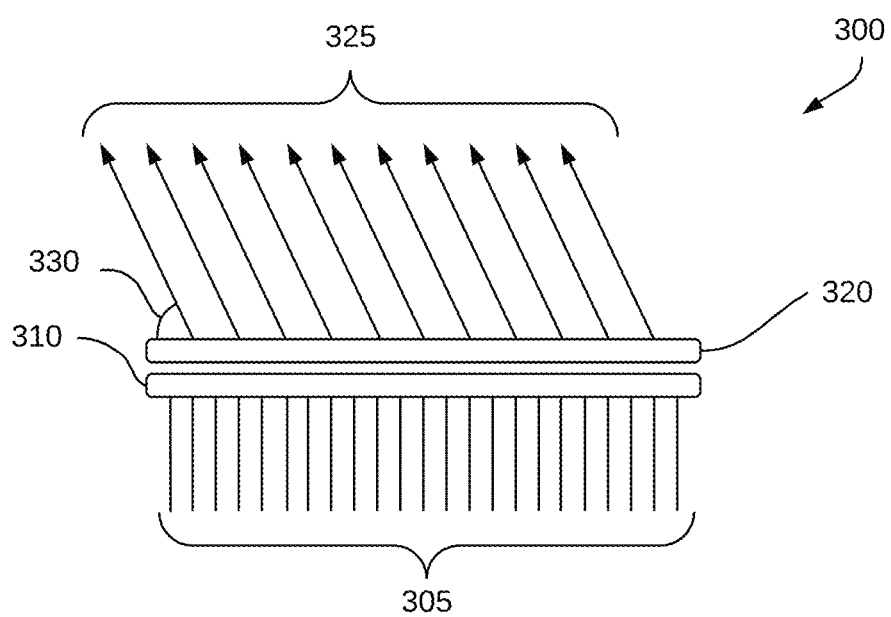
FIG. 4 shows an alternative transmitter arrangement, in accordance with an embodiment.

Another example of a transmitter 300 is shown in FIG. 4, in accordance with an embodiment. Transmitter 300 includes a plurality of optical fiber inputs 305 that are directed into a coupler 310, which in turn directs light from optical fiber inputs 305 into an optical phased array 320. Resulting light rays 325 are transmitted from optical phased array 320 at an angle 330 with respect to a surface of optical phased array 320.

Figure 5:
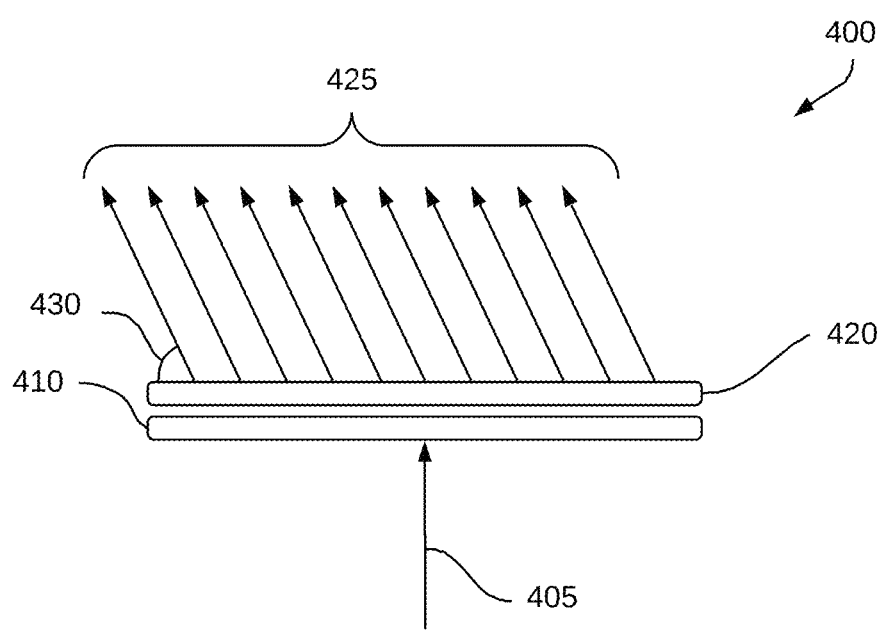
FIG. 5 shows still another alternative transmitter arrangement, in accordance with an embodiment.

Still another alternative embodiment of a transmitter 400 is shown in FIG. 5. A light input 405 enters a coupler 410, which splits light input 405 into multiple portions directed into an optical phased array 420. Coupler 410 may include, for example, a plurality of splitters that divides light input 405 into multiple portions. Optical phased array 420 then directs the multiple portions of light input 405 as light rays 425 at an angle 430 with respect to a surface of optical phased array 420.

Recent innovations in optical signal transceivers, such as the incorporation of optical phased arrays, have potentially enormous benefits for integrating into existing aeronautical and space communication systems. For instance, embodiments including optical phased arrays are essentially small terminated fiber bundles that can be readily distributed among the unused interstitial areas on an aircraft, as an example.

One difficulty in implementing such innovations is to have a large enough receiver area for receiving the optical signals. In the embodiments described herein, the aircraft windshields and passenger windows are used as large area receiver apertures, thus serving a double purpose of providing outside visibility to the aircraft operator as well as collecting optical communications signals. That is, light in the visible spectrum will still be transmitted through so that the aircraft operator is still able to see through the windshield. Selected wavelengths outside of the visible range, such as C-band wavelengths around 1550 nm, are directed to an edge of the windshield to be detected by communications receivers, such as high speed detectors. Additional dichroic coating on the interior window can be used to eliminate the transmission of optical communication signals into the aircraft.

It would be desirable to have an optical receiver that uses non-mechanical means for tracking satellites, while receiving the laser signals from those satellites over a wide range or angles, and converting that light into a useful data stream. A plurality of such optical receivers can be used to simultaneously receive data from spatially separated sources. Alternatively, a plurality of optical receivers can be used together to essentially increase the optical receiver surface area, thus allowing for better detection of weak signals.

As was shown in FIG. 1, optical signals travel between different transceivers in the optical communication system as the transceivers in the air and space are moving at high rates of speeds. It would be desirable for the transceivers to be able to receive the optical signals over a range of angles so as to increase their transmission efficiency.

Figure 6:
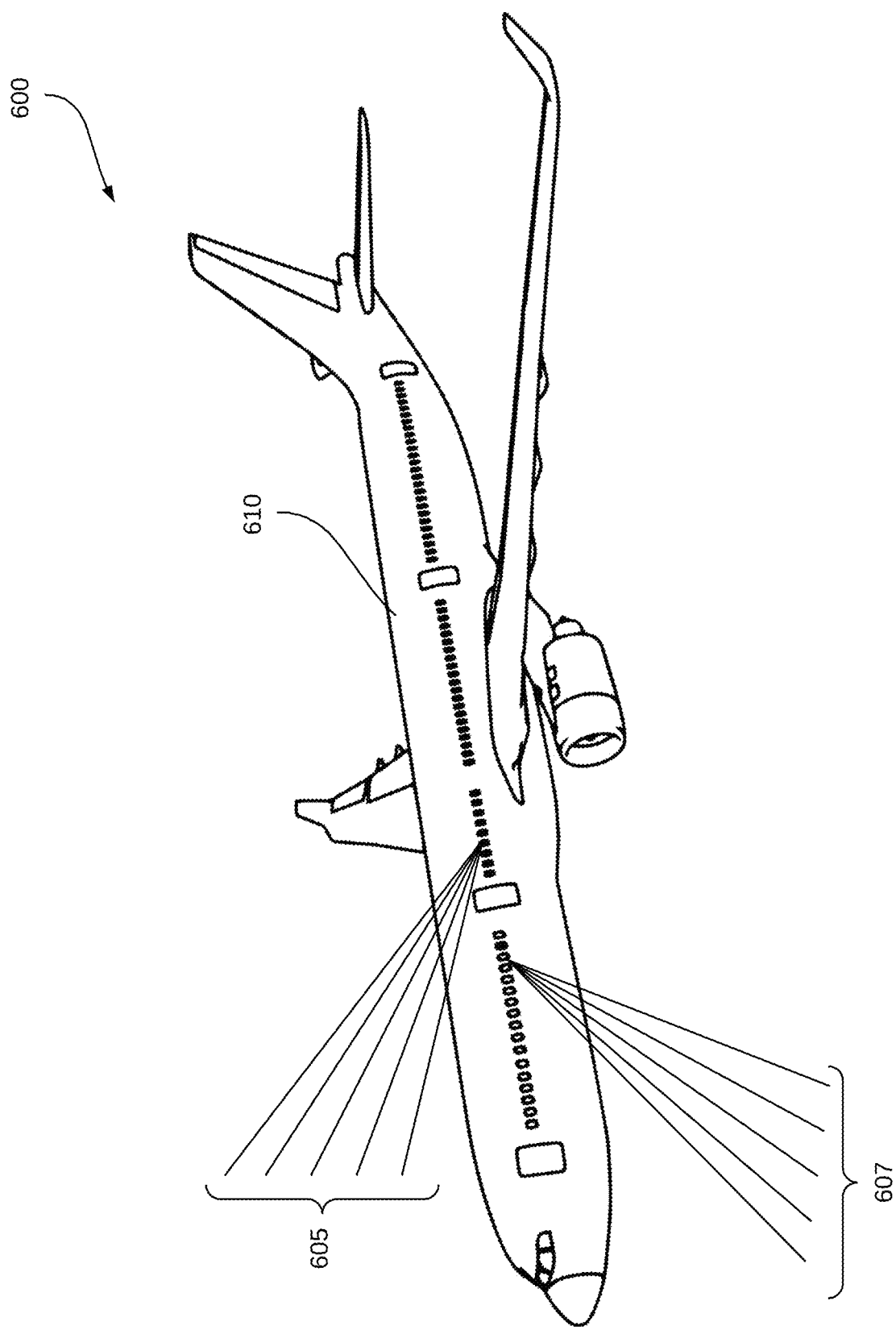
FIG. 6 illustrates the way optical signals are incident on an aircraft from a variety of angles.

Referring now to FIG. 6, an aircraft 600 is shown. First light rays 605 from above (e.g., from a satellite) and second light rays 607 from below (e.g., from a ground station, another aircraft, an unmanned autonomous vehicle (UAV), a ground vehicle, or a nautical vessel) are incident on aircraft 600 from a variety of angles. In an exemplary embodiment, one or more of the various windows of aircraft 600 includes waveguiding layers to enable the windshield itself to gather optical communication signals and direct the signals to a receiver located at an edge of the windshield. The waveguiding layers can be incorporated into the side passenger windows, emergency exit windows, and even the cockpit windshield, as long as a light in the visible spectrum is transmitted though the waveguiding layers, while the optical communication signals particularly in the communications wavelengths (such as the c band) are diverted by the waveguiding layers to the receiver. In this way, the effective surface area available for optical signal reception is increased to the total area covered by the waveguiding layers, which would be greater than 100 square meters if the waveguiding layers are integrated into many of the aircraft windows.

For instance, a holographic layer integrated into the windshield allows the coupling of received light into a transverse optical waveguide. Additional components, such as a liquid crystal optical angle switch device, prior to the holographic layer, allows redirection of light from a variety of angles into the transverse optical waveguide. The liquid crystal optical angle switch device can be configured to compensate for differences in the pulse arrival time of the optical signals at the receiver, depending on the azimuthal and elevation angles of the light incidence at the windshield. Optionally, a separate compensator can be included in the system to provide additional and/or adjustable optical compensation. In this way, optical signals are coupled into the transverse optical waveguide for detection by receivers, such as high speed opto-electronic detectors, located at an edge of the windshield.

Figure 7:
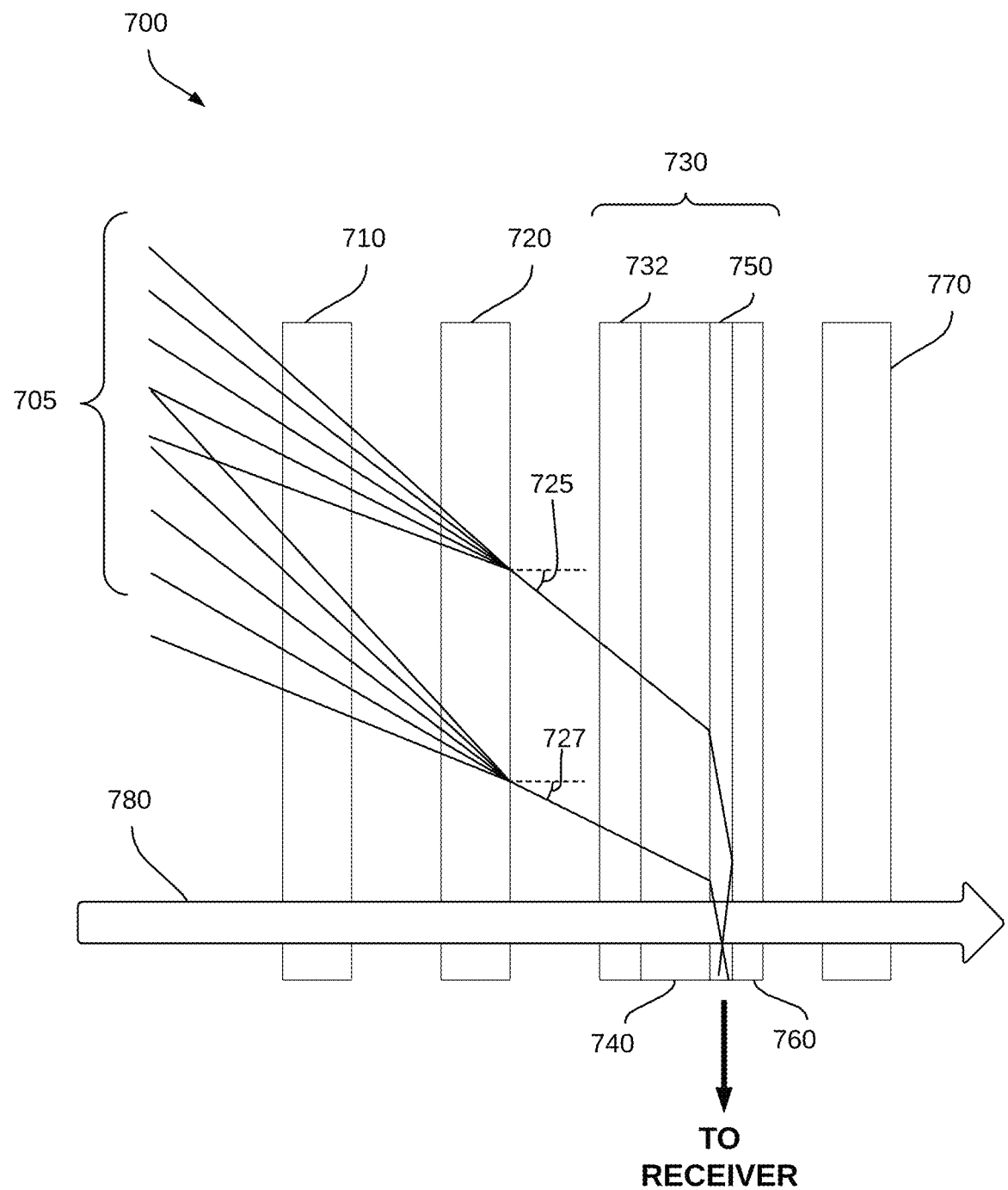
FIG. 7 shows an exemplary optical signal receiver arrangement, in accordance with an embodiment.

FIG. 7 shows an exemplary embodiment of a waveguiding arrangement 700 for directing optical communication signals incident on a windshield toward a receiver (not shown). Optical signals, represented by rays 705, are incident on an external window 710 over a variety of angles. In this exemplary embodiment, waveguiding arrangement 700 includes a liquid crystal switch 720 for steering optical signals 705 from a variety of angles into output rays at predetermined angles 725 and 727, which are within the range of acceptance angles for a waveguide 730. Waveguide 730 includes a first substrate 732 supporting a holographic angle converter 740. Holographic angle converter 740 is configured for coupling the light received thereon into a transverse optical waveguide 750, which is sandwiched between holographic angle converter 740 and a second substrate 760. Thus, optical signals incident on external window 710 are selectively directed toward a receiver (not shown) rather than being passed through an internal window 770 and into the aircraft cockpit. Meanwhile, visible light 780 is transmitted through waveguiding arrangement 700.

It is emphasized that components of waveguiding arrangement 700, including liquid crystal switch 720, holographic angle converter 740, and transverse optical waveguide 750 are specifically designed for operating in a wavelength range used for optical communications. In this way, waveguiding arrangement 700 does not affect light of visible wavelengths such that the vision of the aircraft passenger or operator is not affected by the inclusion of waveguiding arrangement 700 in the aircraft window. Additionally, internal window 770 or second substrate 760 can include a dichroic coating to block out any residual light of the optical communications wavelengths. Optionally, one or more filters or other optical components may be added to waveguide arrangement 700 for light attenuation or other purposes.

Figure 8:
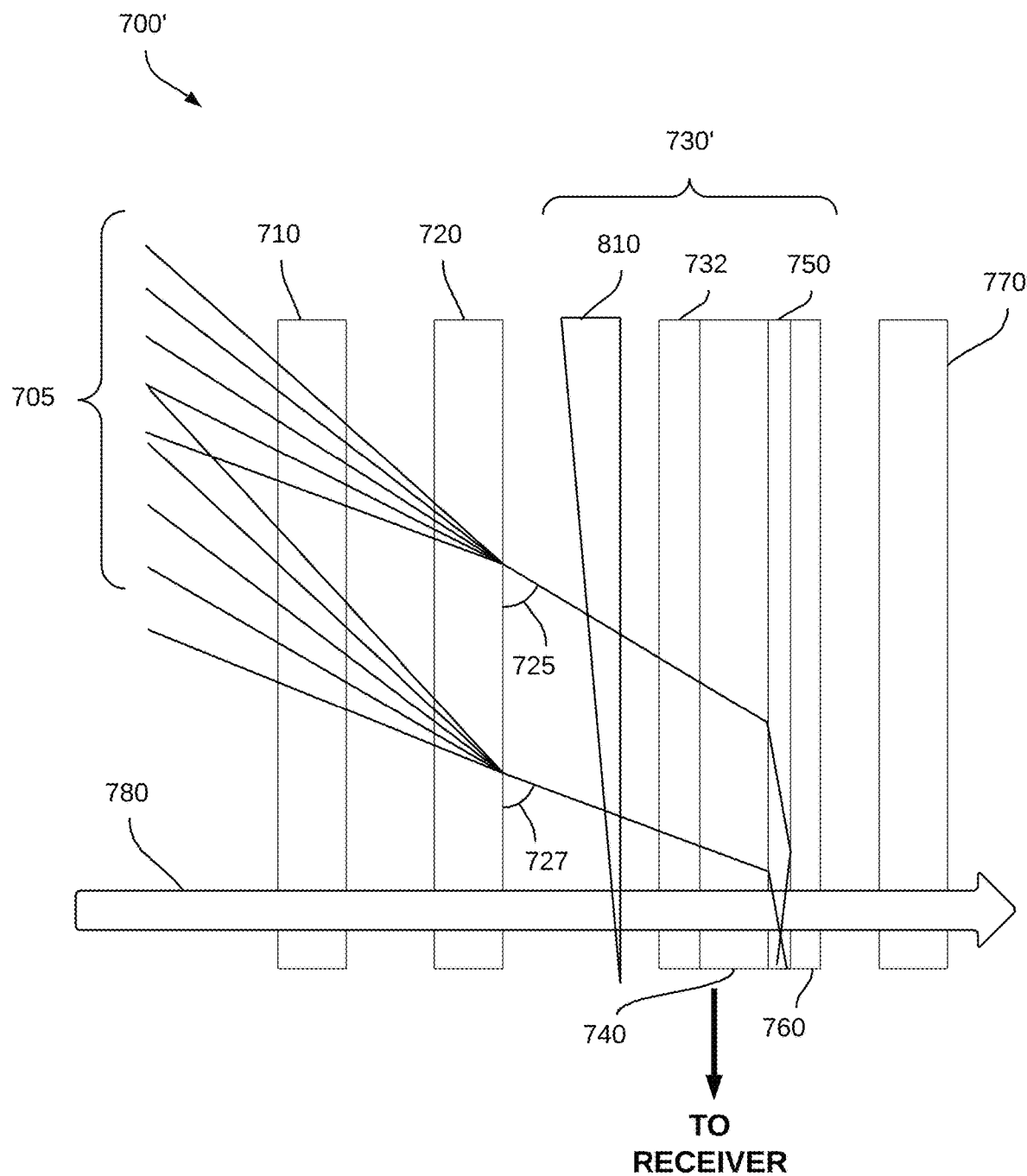
FIG. 8 shows an alternative optical signal receiver arrangement, in accordance with an embodiment.

An alternative embodiment of a waveguide arrangement 700' is shown in FIG. 8. Waveguide arrangement 700' includes a modified waveguide 730', additionally including a compensator 810, which corrects for distance and path length errors introduced by the differences in optical path length within the incidence angles of rays 705. Optionally, compensator 810 is variable such that the optical path length correction introduced by compensator 810 can be adjusted according to the incidence angle and location of the rays received at waveguide arrangement 700'.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. For example, additional amplifiers, beam steering devices, liquid crystal polymer gratings, and other optical components can be incorporated in certain embodiments to boost signals or add other functionality to the transceiver configurations discussed above. As another example, independently controlling each receiver window allows many different networking arrangements to be made. In an example, the aircraft can be simultaneously receiving signals from many different sources and creating a mesh network. By also sending data back via multiple transmitters, the aircraft could provide complex physical layer routing as needed. Furthermore, either one of waveguide 730 and modified waveguide 730' can be retrofitted into an existing airplane window system or windows of other devices, such as UAVs, ships, trucks, buildings, and similar.

Figure 9:
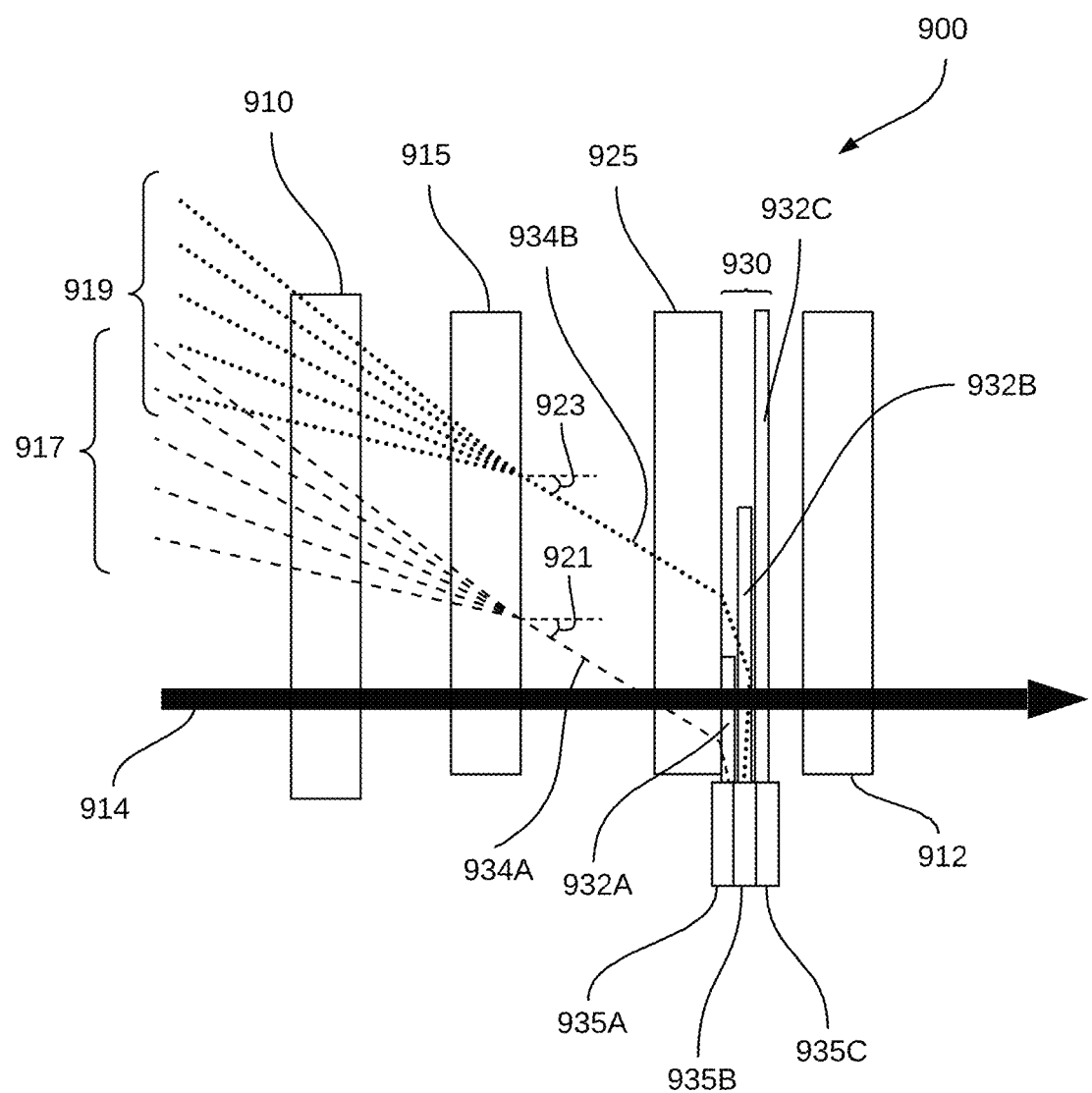
FIG. 9 shows still another alternative optical signal receiver arrangement, in accordance with an embodiment.

FIG. 9 shows still another alternative optical signal receiver arrangement, in accordance with an embodiment. In the optical signal receiver arrangement shown in FIG. 9, the waveguide is split into sections to simplify the recombination and resynchronization of the incoming signals.

Continuing to refer to FIG. 9, an optical signal receiver arrangement 900 is placed between an exterior window 910 and an interior window 912 of, for example, an aircraft or vehicle. Exterior window 910 and interior window 912 are both configured for transmitting visible light 914 therethrough without substantial refraction or alteration. In the illustrated embodiment, exterior window 910 is further configured for transmitting light of optical communications wavelengths, such as in the infrared, therethrough, while interior window 912 is configured for blocking light of optical communication wavelengths.

Optical signal receiver arrangement includes a liquid crystal switch 915, which is configured for steering optical signals from a variety of angles (exemplified by a first set of light rays represented by dashed lines 917 and a second set of light rays represented by dotted lines 919) into output rays at predetermined angles 921 and 923, which are within the range of acceptance angles for a holographic angle converter 925. Holographic angle converter 925 is configured for further steering the output rays into a waveguide arrangement 930. Waveguide arrangement 930 includes two or more light pipe waveguides (three distinct light pipe waveguides 932A-932C are shown in FIG. 9), each one of the light pipe waveguides 932A-932C being configured to only accept light rays from a particular segment of the optical signal receiver arrangement with substantially the same time delay. For example, waveguide 932A is configured for receiving a first output ray 934A, which results from first set of light rays 917 received from a middle portion of exterior window 910 as shown in FIG. 9. Waveguide 932A then directs first output ray 934A to a receiver 935A. Similarly, waveguide 932B is configured for receiving a second output ray 934B, which results from second set of light rays 919 received from an upper portion of exterior window 910. Waveguide 932B then directs second output ray 934B to a receiver 935B. Each one of receivers 935A-935C is configured for introducing a relative time delay with respect to each other one of the receivers to take into account the differences in optical pathlengths traveled by light rays received at different sections of the exterior window. Thus, optical signal receiver arrangement facilitates the accurate recombination of optical signals received across the aperture of the external window into a coherent optical signal at the receiver, reducing adverse effects such as pulse dispersion and energy spreading. Any stray optical signal (not shown) is blocked from being transmitted into the aircraft or vehicle by interior window 912. Additional optical structures, such as optical substrates and refractive films, may be inserted between exterior window 910 and interior window 912.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or subcombination.

For instance, additional adjustment of the emitted beam angles can be performed using a switching mechanism, such as a liquid crystal polymer grating, while fine adjustment can be performed using a finer mechanism, such as fast steering mirrors. Alternative mechanisms for providing such angular adjustment are, and not limited to, retro-reflectors with a back-facet modulator, two-dimensional implementations such as the liquid crystal modulators available from Vescent Photonics, micro-electromechanical (MEMS) modulators, electro-wetting materials from University of Colorado at Boulder and acousto-optic modulators. As another example, the absence of aerodynamic effects allows easy integration into a huge range of aircraft configurations including supersonic or stealth vehicles which are tightly constrained in external aerodynamic surfaces.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. An optical receiver for use in free space communication from a transmitter to the optical receiver, the optical receiver comprising:
    an external window configured for passing visible light as well as optical signals of communication wavelengths therethrough;
    an optical switch;
    a waveguide including a holographic angle converter and a transverse optical waveguide;
    a receiver; and
    an internal window,
    wherein the optical switch is configured for redirecting optical signals from a plurality of different incidence angles into an output ray having an angle within a range of acceptance angles for the holographic angle converter within the waveguide,
    wherein the holographic angle converter is configured for coupling the output ray received thereon into the transverse optical waveguide, and
    wherein the optical switch, the holographic angle converter, and the transverse optical waveguide are optically coupled for selectively directing optical signals of communication wavelengths incident thereon toward the receiver, while passing visible light through to the internal window.

2. The optical receiver of claim 1, further comprising a coating on the internal window for blocking the optical signals of optical communication wavelengths from passing through the internal window.

3. The optical receiver of claim 1, wherein the optical switch is a liquid crystal optical angle switch.

4. The optical receiver of claim 1, wherein the optical switch is configured for compensating for differences in optical path lengths of the optical signals received from the plurality of different incidence angles.

5. The optical receiver of claim 4, further comprising a compensator for providing additional optical path length compensation for further compensating for differences in optical path lengths of the optical signals received from the plurality of different incidence angles.

6. The optical receiver of claim 1, wherein the range of acceptance angles is configured for receiving output rays from at least one of a satellite, a ground station, an aircraft, an unmanned autonomous vehicle (UAV), a ground vehicle, and a nautical vessel.

7. The optical receiver of claim 1, wherein the transverse optical waveguide is split into at least two sections within the waveguide, each of the at least two sections being configured for receiving the output ray from a particular segment of the optical switch.

8. The optical receiver of claim 7, further comprising at least two receivers, wherein each one of the at least two sections of the waveguide is configured for directing the output rays into one of the at least two receivers.

* * * * *